INVENTOR.
ROBERT M. TURNER

Aug. 21, 1962 R. M. TURNER 3,050,694
CORRECTION CIRCUIT FOR DUAL SINUSOID GENERATOR
Filed March 14, 1961 2 Sheets-Sheet 2

INVENTOR.
ROBERT M. TURNER
BY
Agent

3,050,694
CORRECTION CIRCUIT FOR DUAL SINUSOID GENERATOR
Robert M. Turner, Los Altos, Calif., assignor to Lockheed Aircraft Corporation, Burbank, Calif.
Filed Mar. 14, 1961, Ser. No. 95,649
3 Claims. (Cl. 331—45)

The present invention relates to a sinusoid generator and more particularly to a correction circuit for a dual sinusoid generator to provide highly accurate sine and cosine wave forms.

Prior systems for generation of sinusoidal signals have had the primary disadvantage of being frequency sensitive. That is, while at lower frequencies the sine and cosine signals may be relatively exact, at higher frequencies there is considerable deviation from the desired sine and cosine signals.

The present invention obviates the disadvantage of these prior systems by employing one non-negative constraint relationship which is instantaneous and another non-negative constraint relationship which is taken over a finite period of time. These non-negative constraint relationships are subjected to a minimization procedure, and the vector giving the direction of greatest decrease in error is employed. In this manner a correction circuit for a sinusoid generator is provided wherein the error is maintained at a minimum and as a result the sine and cosine signals have very small deviation in amplitude and are extremely accurate in frequency and in phase relationship over a relatively large frequency range.

Accordingly, an object of the present invention is to provide a correction circuit for a sinusoid generator which utilizes a minimum of components and is highly reliable.

Another object of the present invention is to provide a sinusoid generator providing highly accurate sine and cosine wave forms.

A further object of the present invention is to provide a correction circuit for a sinusoid generator which is frequency insensitive.

A further object of the present invention is to provide a correction circuit for a sinusoid generator wherein the vector giving the most rapid decrease of error is employed.

A still further object of the present invention is to provide a correction circuit for a sinusoid generator which employs both an instantaneous constraint and a constraint taken over a finite period of time.

The specific nature of the invention, as well as other object, uses and advantages thereof, will clearly appear from the following description and from the accompanying drawing in which.

Figure 1:
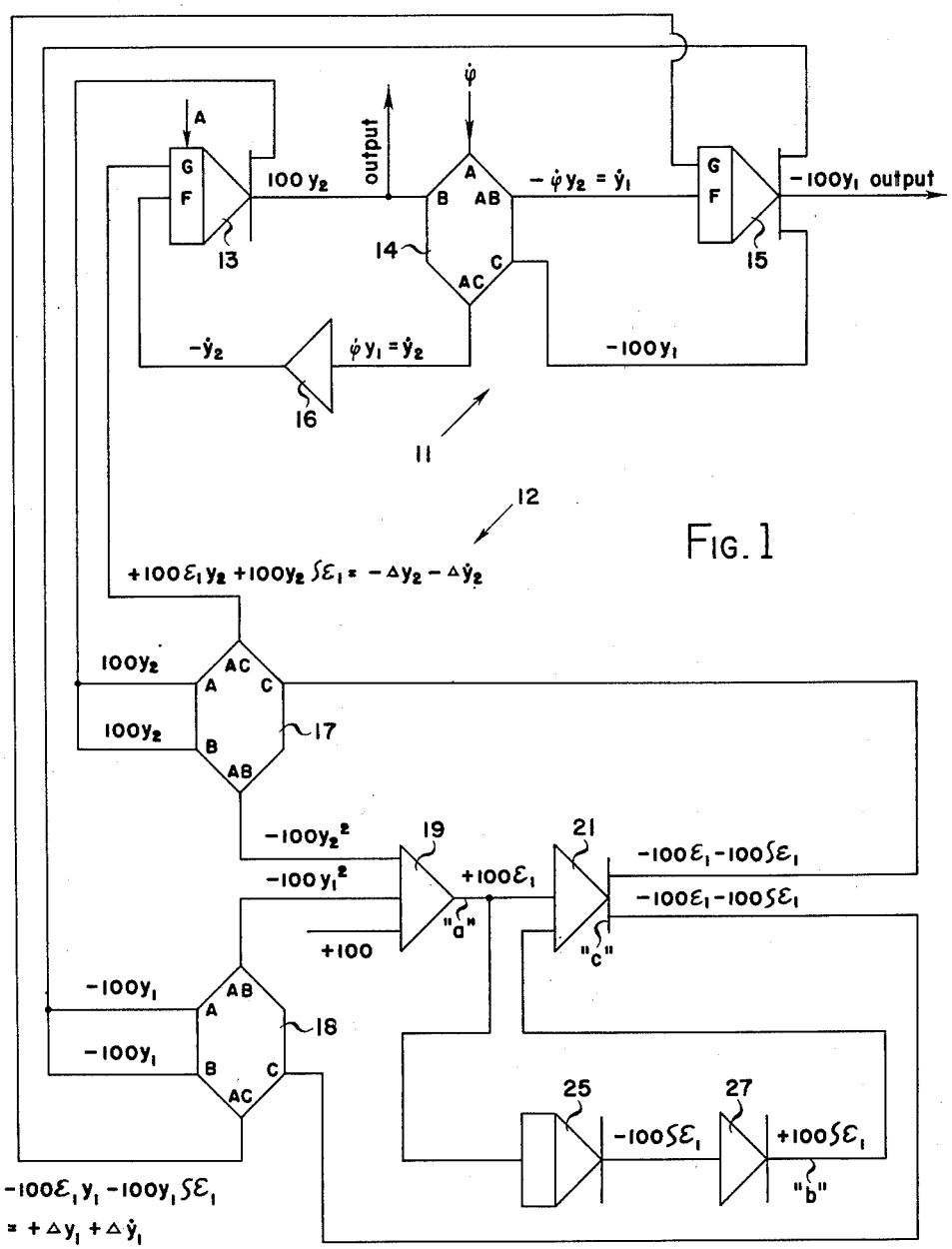
FIGURE 1 is a schematic illustration of the sinusoid generator and correction circuit of the present invention.

In order to more completely understand the unique characteristics of the present invention the following mathematical analysis is considered necessary:

The basic $n$ first order differential equation set describing a physical system may be written as:

(1)
$$\dot{y}_1 = f_1(x_1, x_2, \ldots x_p; y_1, y_2, \ldots y_n)$$
$$\dot{y}_2 = f_2(x_1, x_2, \ldots x_p; y_1, y_2, \ldots y_n)$$
$$\vdots$$
$$\dot{y}_n = f_n(x_1, x_2, \ldots x_p; y_1, y_2, \ldots y_n)$$

where $\dot{y}$ is the derivative with respect to time and $x_1$, $x_2$ etc. are independent or driving functions.

The constraint equation set to be imposed on the system defined by equation set (1) may be defined as:

(2)
$$\epsilon_1 = \epsilon_1(x_1, x_2, \ldots x_p; \dot{y}_n; y_1, y_2, \ldots y_n)$$
$$\vdots$$
$$\epsilon_q = \epsilon_q(x_1, x_2, \ldots x_p; \dot{y}_n; y_1, y_2, \ldots y_n)$$

This equation set is written such that $\epsilon_j$ equals zero for all $j$. Since the $x_r$ are considered to be independent variables or driving functions, any deviation of the $\epsilon_j$ from zero must be due to incorrect values obtained from $y_i{}^u$ in the solution of set (1) (where $u=0$ for $y_i$ and 1 for $\dot{y}_i$).

Since it is desirable to consider all of the $\epsilon_j$ simultaneously, the minimization of a non-negative function E of $\epsilon_j$ is taken where (3)
$$E = \sum_{j=1}^{q} (\epsilon_j)^2$$

For any given value of $x_r$ and $y_i{}^u$ the change required in each of the $y_i{}^u$ making up E may be found by considering E as a surface of Euclidean N space. The vector giving the direction of greatest change E is the gradient vector $\nabla E$ and is defined by the relation (4) $$-\nabla E = 2\sum_{j=1}^{q} \epsilon_j \frac{\partial \epsilon_j}{\partial y_i{}^u} \text{ for } \begin{bmatrix} u=0,1 \\ i=1,2,\ldots n \end{bmatrix}$$

It is then possible to assign to each $\Delta y_i{}^u$, where $\Delta y_i{}^u$ is defined as the correction term to be added to the $y_i{}^u$ obtained from the solution of set (1), the value (5) $$\Delta y_i{}^u = -\sum_{j=1}^{q} K_j \epsilon_j \frac{\partial \epsilon_j}{\partial y_i{}^u} \text{ for } \begin{bmatrix} u=0,1 \\ i=1,2,\ldots n \end{bmatrix}$$

That is, to each $y_i{}^u$ is added a value proportional to the component of $-\nabla E$ in the $y_i{}^u$ direction. $K_j$ is a weighting factor determined by the importance attached to the particular $\epsilon_j$. In the present invention the gradient is determined and the corrections added continuously and in this manner no sequential series of steps is taken along one gradient before the next is determined.

Since these corrections are added directly and continuously to the positional values of $y_i{}^u$, each member of the corrected differential equation set becomes:

(6)
$$\dot{y}_i' = f_i[x_1, x_2, \ldots x_p; y_1, y_2, \ldots y_n] + \Delta \dot{y}_i$$
$$y_i = \int \dot{y}_i dt + \Delta y_i$$

where $\dot{y}_i'$ is the corrected rate term.

It should be particularly noted that $\Delta y_i$ is not the integral of $\Delta \dot{y}_i$ as each arises independently from Equation 5. For purpose of definition, differential equation set (6) is referred to as the $E_P$ correction of equation set (1). The subscript P denotes that the correction is inserted so as to change the instantaneous position of the variable.

The method of correction is in general quite difficult to implement on an analog computer due to the formation of algebraic loops in the generation of the error terms. However, it is to be particularly noted that it is possible to consider each $\Delta y_i{}^u$ to raise from a change in the defining rate of $y_i{}^u$ which may be expressed by the relation:

(7) $$\frac{d}{dt}(\Delta y_i{}^u) = -\sum_{j=1}^{q} K_j \epsilon_j \frac{\partial \epsilon_j}{\partial y_i{}^u} \text{ for } \begin{bmatrix} u=0,1 \\ i=1,2,\ldots n \end{bmatrix}$$

This will likewise give to each $y_i{}^u$ a correction in the desired direction since $$d(\Delta y_i{}^u) = -\left[\sum_{j=1}^{q} K_j \epsilon_j \frac{\partial \epsilon_j}{\partial y_i{}^u}\right] dt$$

which may be rewritten as $$\Delta y_i{}^u = \int \left[-\sum_{j=1}^{q} K_j \epsilon_j \frac{\partial \epsilon_j}{\partial y_i{}^u}\right] dt$$

Therefore each member of the corrected differential equation set becomes (8) $\dot{y}_1' = f_1(x_1, x_2, \ldots x_p; y_1, y_2, \ldots y_n) + \int \Delta \dot{y}_1 dt$
$y_1 = \int (\dot{y}_1 + \Delta \dot{y}_1) dt$ For purpose of definition, differential equation set (8) is referred to as the $E_R$ correction of equation set (1). The subscript R denotes that the correction is inserted so as to change the instantaneous rate of the variable.

Both $E_p$ and $E_R$ corrections are applied in the system of the present invention. In this case, Equation 8 becomes (9) $\dot{y}_1' = f_1(x_1, x_2, \ldots x_p; y_1 y_2, \ldots y_n) + \Delta y_1 + \Delta \dot{y}_1$ In summary, Equation 5 shows that corrections may arise for all functions and their derivatives which occur explicity in the constraint equations. Equations 6, 7, 8 and 9 show how the corrections may be added to systems defined by equation set (1).

In the generator system shown in FIGURE 1 it is desired to generate sin $\varphi$ and cos $\varphi$ signals where the frequency of these signals is determined by the $\varphi$ input voltage and the amplitude of these signals is determined by the initial condition set by the voltage A applied to the input of integrator 13. By definition cos $\varphi$ and sin $\varphi$ are as follows:

(10) $\qquad y_1 = \cos \varphi$
(11) $\qquad y_2 = \sin \varphi$ and the derivative of $y_1$ and $y_2$ with respect to time provides:

(12) $\qquad \dot{y}_1 = -\dot{\varphi} \sin \varphi$
(13) $\qquad \dot{y}_2 = \dot{\varphi} \cos \varphi$ The equations which define forced oscillation of the generator system in FIGURE 1 are as follows:

(14) $\qquad \dot{y}_1 = -\dot{\varphi} y_2$
(15) $\qquad \dot{y}_2 = \dot{\varphi} y_1$ It is necessary to solve Equations 14 and 15 as accurately as possible which necessitates the use of constraints which are meaningful to the system. That is, it is desirable to obtain corrections for $\dot{y}_1$, $y_1$, $\dot{y}_2$ and $y_2$.

One such system constraint is defined in terms of $y_1$ and $y_2$ and may be obtained from the trigonometric relationship

(16) $\qquad \sin^2 \varphi + \cos^2 \varphi = 1$ which exists when exact sine and cosine waves are being generated. By combining Equations 8, 9 and 14 a system constraint defined in terms of $y_1$ and $y_2$ may be defined as:

(17) $\qquad y_1^2 + y_2^2 - 1 = \epsilon_1$ where $\epsilon_1$ is the amplitude error.

A second system constraint defined in terms of $\dot{y}_1$ and $\dot{y}_2$ may be determined from the trigonometric relation

(18) $\qquad \tan^{-1} \frac{y_2}{y_1} = \varphi$ which also exists when exact sine or cosine waves are being generated. The derivative of Equation 18 is

(19) $\qquad \frac{d}{dt} \left[ \tan^{-1} \frac{y_2}{y_1} \right] = \dot{\varphi} = \frac{y_1 \dot{y}_2 - y_2 \dot{y}_1}{y_1^2 + y_2^2}$ from which is obtained the relation

(20) $\qquad y_1 \dot{y}_2 - y_2 \dot{y}_1 - \dot{\varphi} = \dot{\varphi} \epsilon_1 = \epsilon_2$ To provide a solution of $\Delta y_1$ and $\Delta y_2$ the partial derivative of $\epsilon_1$ with respect to $y_1^2$ and $y_2^2$, respectively, of Equation 17 results upon substitution in Equation 5 in the relationships:

(21) $\qquad \Delta y_1 = -2K \epsilon_1 y_1$
(22) $\qquad \Delta y_2 = -2K \epsilon_1 y_2$ The constraint relations defined in Equations 17 and 20 provide instantaneous constraints. The $\epsilon_1$ constraint relation (Equation 17) is effective in stabilizing the system; however, it has been experimentally determined that $\Delta y_1$ and $\Delta y_2$ corrections obtained from the $\epsilon_1$ minimization are not sufficient to eliminate a bias or offset error in $\epsilon_1$ as illustrated by the curve shown in FIGURE 2B. A continuous offset is detrimental because there will always be an amplitude error in either or both the sine or cosine signals.

By minimizing the square of the integral of $E_2$ by the $E_p$ scheme [see Equations 3, 4 and 5], particularly simple correction terms for $\dot{y}_1$ and $\dot{y}_2$ are formed which completely eliminate the bias error. The terms $\Delta \dot{y}_1$ and $\Delta \dot{y}_2$ are formed by the relationship existing in Equation 2 and this renders it possible to employ the $\epsilon_1$ previously calculated from $y_1$ and $y_2$ to provide information about $\dot{y}_1$ and $\dot{y}_2$.

The square of the integral of $\epsilon_2$ is:

(23) $\qquad [\int (y_1 \dot{y}_2 - y_2 \dot{y}_1 - \dot{\varphi}) dt]^2 = [\int \dot{\varphi} \epsilon_1 dt]^2 = [\int \epsilon_2]^2$ Minimizing Equation 23 with respect to $\dot{y}_1$ and $\dot{y}_2$ by the $E_p$ scheme [see also Equation 5] $\Delta \dot{y}_1$ is defined as

(24) $\qquad \Delta \dot{y}_1 = -K \int \dot{\varphi} \epsilon_1 dt \frac{\partial}{\partial \dot{y}_1} \int \dot{\varphi} \epsilon_1 dt$ and

(25) $\qquad \Delta \dot{y}_2 = -K \int \dot{\varphi} \epsilon_1 dt \frac{\partial}{\partial \dot{y}_2} \int \dot{\varphi} \epsilon_1 dt$ Assuming $\dot{\varphi}$ as being a constant, then $\Delta \dot{y}_1 = -K \dot{\varphi} \int \epsilon_1 dt \frac{\partial}{\partial \dot{y}_1} \int (y_1 \dot{y}_2 - y_2 \dot{y}_1 - \dot{\varphi}) dt$
$= -K \dot{\varphi} \int \epsilon_1 dt \int -y_2 dt$
$= -K \dot{\varphi} \int \epsilon_1 dt \int -\sin(\dot{\varphi} t) dt$
$= -K \dot{\varphi} \int \epsilon_1 dt \left( \frac{\cos \varphi}{\dot{\varphi}} \right)$
$= -K y_1 \int \epsilon_1 dt$ By employing a similar procedure $\Delta \dot{y}_2$ is defined as

(27) $\qquad \Delta \dot{y}_2 = -K y_2 \int \epsilon_1 dt$

Experimental evidence verifies that these values of $\Delta y_1$ and $\Delta y_2$ [Equations 26 and 27] provide the necessary correction regardless of whether $\dot{\varphi}$ is a constant or is a variable as to both sign and/or amplitude.

The corrected system equations of the present invention are obtained by adding $y_1$ and $y_2$ according to the $E_R$ method and $\dot{y}_1$ and $\dot{y}_2$ according to the $E_p$ method and by utilizing the forced oscillation system Equations 14 and 15. Therefore, by substituting these parameters into Equation 9 the corrected system equations are:

(28) $\qquad \dot{y}_1 = -\dot{\varphi} y_2 - 2K \epsilon_1 y_1 - K y_1 \int \epsilon_1$
(29) $\qquad \dot{y}_2 = \dot{\varphi} y_1 - 2K \epsilon_1 y_2 - K y_2 \int \epsilon_1$ In FIGURE 1 of the drawing is illustrated the dual sinusoid generator and correction circuit of the present invention which is the implementation of corrected system Equations 28 and 29. In this drawing is illustrated a conventional dual sinusoid generator denoted by reference numeral 11 and the correction circuit denoted by reference numeral 12. Dual sinusoid generator includes integrator 13, dual channel multiplier 14, integrator 15 and inverter 16. The circuit parameters of these elements forming the sinusoid generator are selected to correspond with Equations 14 and 15 wherein the frequency of oscillation is determined by a voltage applied to dual channel multiplier 14 denoted by $\dot{\varphi}$ and the amplitude is determined by a voltage A applied to the input of integrator 13.

Assuming multiplier 14 has an attenuation factor of 100, then to prevent closed loop circuit attenuation each integrator is provided with a gain factor of 100. It can therefore be seen that the $100y_2$ input to multiplier 14 will result in a $-y_2 \dot{\varphi}$ output. The negative sign is due to the inversion characteristics of a multiplier. From Equation 14 it can be seen that $-\dot{\varphi}y_2$ equals $\dot{y}_1$ and when integrated and amplified by integrator 15 results in $-100y_1$ which provides the cosine output by definition. The negative sign is due to the inversion characteristics of an integrator. This $-100y_2$ output is multiplied by $\dot{\varphi}$ and attenuated by multiplier 14 resulting in an $\dot{\varphi}y_1$ output which from Equation 15 is equal to $\dot{y}_2$. Inverter 16 is provided merely to invert $\dot{y}_2$ to $-\dot{y}_2$ so that when applied to the input of integrator 13, which inverts the input signal, results in a $100y_2$ output and the circuit will therefore provide sustained forced oscillations. Due to the inherent characteristics of sinusoid generators of this type there is deviation from the exact sine and cosine wave forms which are desired.

The correction circuit 12 which is employed to correct this deviation or error of the sine and cosine wave forms includes dual channel multiplier 17, dual channel multiplier 18, summing amplifier 19, summing amplifier 21, integrator 25 and inverter 27. The sine output of integrator 13 is applied to the A and B inputs of multiplier 17 and the cosine output of integrator 15 is applied to the A and B inputs of multiplier 18. The inverted AB output of multiplier 17, the inverted AB output of multiplier 18 and a voltage having a constant amplitude of $+100$ are applied to the respective inputs of summing amplifier 19. It should be noted that the 100 terms of the AB products of multipliers 17 and 18 is not $100^2$ since there is a 100 attenuation factor in each multiplier. It can be readily seen from Equation 17 that the summation of these inputs is $100(-y_1^2-y_2^2+1)=-100\epsilon_1$ and upon inversion by the amplifier the output thereof is $100(y_1^2+y_2^2-1)=+100\epsilon_1$. The output of summing amplifier 19 is applied to the input of summing amplifier 21 and is also applied to the input of integrator 25 which inverts and provides an output of $-100\int\epsilon_1$. The output of integrator 25 is inverted by inverter 27 resulting in a $+100\int\epsilon_1$ output which is applied to the input of summing amplifier 21. The inputs of summing amplifier 21 are summed and inverted resulting in a $-100\epsilon_1-100\int\epsilon_1$ output. From the constraint relations of Equation 21, 22, 26 and 27 it can be seen that the sine and cosine terms must be introduced into the output of summing amplifier 21. For the sine term, this is accomplished by applying the output of summing amplifier 21 to the C input of multiplier 17. The AC output of multiplier 17 is therefore $+100\epsilon_1 y_2+100 y_2\int\epsilon_1$ which is equal to $-\Delta y_2-\Delta \dot{y}_2$ (see Equations 22 and 27, respectively) and is applied to the G input of integrator which is summed with $-\dot{y}_2$. It will be noted that due to the inversion characteristics of integrator 13 it is necessary that the signs of Equations 9 and 29 be reversed and the AC output of multiplier 17 therefore has the proper signs for summation with $\dot{y}_2$. From this it can be seen that the error correction which is applied to the G input of integrator 13 corresponds with corrected system Equation 29 with inverted signs. To introduce the cosine term, the output of summing amplifier 21 is applied to the C input of multiplier 18 which results in an AC product output of $-100\epsilon_1 y_1-100 y_1\int\epsilon_1$ which is equal to $+\Delta y_1+\Delta \dot{y}_1$ (see equations 21 and 26, respectively). This AC output is applied to the G input of integrator 15 wherein it is summed with $\dot{y}_1$ or $-\dot{\varphi}y_2$. Therefore, this error correction which is applied to the G input of integrator 15 corresponds with corrected system Equation 28.

Figure 2A:
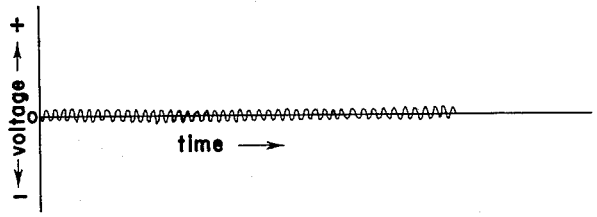
FIGURES 2A through 2D are diagrams showing the error signals for purpose of intuitive analysis of the present invention.
Figure 2B:
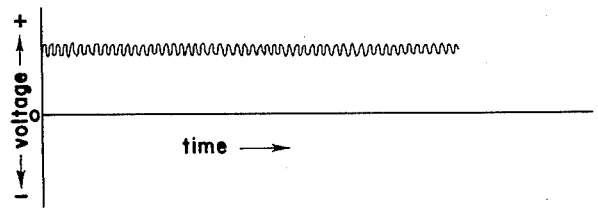
Figure 2C:
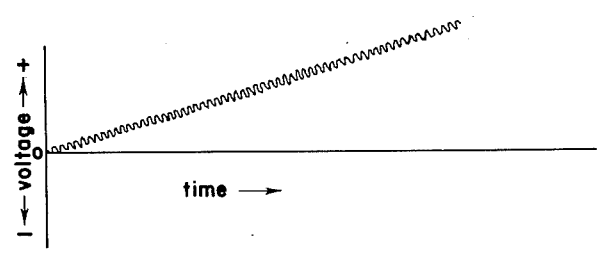
Figure 2D:
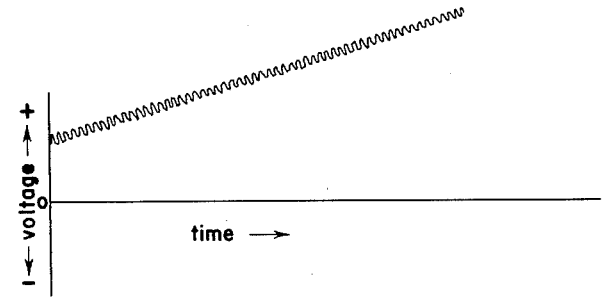

An intuitive analysis of the present invention is as follows: In FIGURE 2A is shown a typical or desired error signal at point "a" of FIGURE 1. Obviously, if the sine and cosine waves were exact, there would be no signal at point "a" and consequently the voltage would remain zero as a function of time. It has been found that at relatively low frequencies of operation the voltage at "a" would be similar to that shown in FIGURE 2A by use of only the instantaneous correction scheme wherein the integration of $\epsilon_1$ was not performed. However, at higher frequencies the error signal at point "a" of FIGURE 1 may vary about a finite voltage as illustrated in FIGURE 2B. This may occur, for example, when the output of integrator 15 is $-99y_1$ rather than $-100y_1$ as desired. To prevent this undesirable condition, the voltage at point "a" is integrated which results in a voltage at point "b" of FIGURE 1 similar to that shown in FIGURE 2C. The voltage at point "a" is then added to the voltage at point "b" which results in a voltage at point "c" of FIGURE 1 similar to that shown in FIGURE 2D. This large correction voltage is applied to the integrators which rapidly increases the $-99y_1$ signal to $-100y_1$. In actual operation, curves such as shown in FIGURES 2B, 2C and 2D do not occur since the integration function never permits the error signal to vary about a finite voltage and the voltage at point "a" will be as shown in FIGURE 2A at all frequencies of operation.

Operation of the present invention in the frequency range of from about .1 to about 50 cycles per second and at amplitudes of from about 0 to about 100 volts with an output current of about 25 milliamps have resulted in amplitude deviations of less than .1 percent, frequency deviation of less than .5 percent and a phase angle deviation between the sine and cosine signals of less than $\pm .2$ degrees.

It is to be understood in connection with this invention that the embodiments shown are only exemplary, and that various modifications can be made in construction and arrangement within the scope of the invention as defined in the appended claims.

What is claimed is:

1. A sinusoid generator comprising a first integrator, a second integrator, a dual channel multiplier and an inverter, the output of said first integrator connected to the one input of said multiplier, one output of said multiplier connected to the input of said second integrator, the output of said second integrator connected to another input of said multiplier, the other output of said multiplier connected to the input of said inverter, the output of said inverter connected to the input of said first integrator, whereby forced oscillations of said sinusoid generator provide sine wave signals at the output of said first integrator and cosine wave signals at the output of said second integrator, an error correction circuit for said sinusoid generator comprising means detecting the instantaneous amplitude error between said sine wave signals and cosine wave signals, means integrating the detected instantaneous amplitude error between said since wave signal and said cosine wave signal, means applying the instantaneous amplitude error and the integrated instantaneous amplitude error to the inputs of said first and second integrators thereby reducing said instantaneous and integrated amplitude errors between said sine and cosine wave signals.

2. A sinusoid generator comprising a first integrator, a second integrator, a dual channel multiplier and an inverter, the output of said first integrator connected to the one input of said multiplier, one output of said multiplier connected to the input of said second integrator, the output of said second integrator connected to another input of said multiplier, the other output of said multiplier connected to the input of said inverter, the output of said inverter connected to the input of said first integrator, whereby forced oscillations of said sinusoid generator provide sine wave signals at the output of said first integrator and cosine wave signals at the output of said second integrator, an error correction circuit for said sinusoid generator comprising first means operatively connected to the output of said first integrator for squaring said sine wave signals, second means operatively connected to the output of said second integrator for squaring said cosine wave signals, first summing means operatively connected to the outputs of said first and second means for summing said squared sine and cosine signals and subtracting a constant signal having a predetermined amplitude thereby providing error signals, integrating means operatively connected to the output of said first summing means for integrating said error signals, second summing means operatively connected to the outputs of said first summing means and to the output of integrating means for summing said error signals and said integrated error signals, means operatively interconnecting the output of said second summing means to the inputs of said first and second integrators of said sinusoid generator thereby reducing said error signals.

3. A sinusoid generator comprising a first integrator, a second integrator, a dual channel multiplier and an inverter, the output of said first integrator connected to the one input of said multiplier, one output of said multiplier connected to the input of said second integrator, the output of said second integrator connected to another input of said multiplier, the other output of said multiplier connected to the input of said inverter, the output of said inverter connected to the input of said first integrator, whereby forced oscillations of said sinusoid generator provide sine wave signals at the output of said first integrator and cosine wave signals at the output of said second integrator, an error correction circuit for said sinusoid generator comprising first means operatively connected to the output of said first integrator for squaring said sine wave signals, second means operatively connected to the output of said second integrator for squaring said cosine wave signals, first summing means operatively connected to the outputs of said first and second means for summing said squared sine and cosine signals and subtracting a constant signal having a predetermined amplitude thereby providing error signals, integrating means operatively connected to the output of said first summing means for integrating said error signals, second summing means operatively connected to the outputs of said first summing means and to the output of integrating means for summing said error signals and said integrated error signals, said first means being operatively connected to the output of said integrating means for obtaining the product of said error and integrated error signals and said sine wave signals, means applying said product to the input of said first integrator, said second means being operatively connected to the output of said integrating means for obtaining the product of said error and integrated error signals and said cosine wave signals, means applying said last mentioned product to the input of said second integrator.

References Cited in the file of this patent

UNITED STATES PATENTS

| | | |
|---|---|---|
| 2,896,162 | Berger et al. | July 21, 1959 |
| 2,907,400 | Swafford | Oct. 6, 1959 |
| 2,980,332 | Brouillette et al. | Apr. 18, 1961 |